(No Model.) 3 Sheets—Sheet 1.
D. R. FRALEY.
TOBACCO CASING MACHINE.
No. 523,910. Patented July 31, 1894.
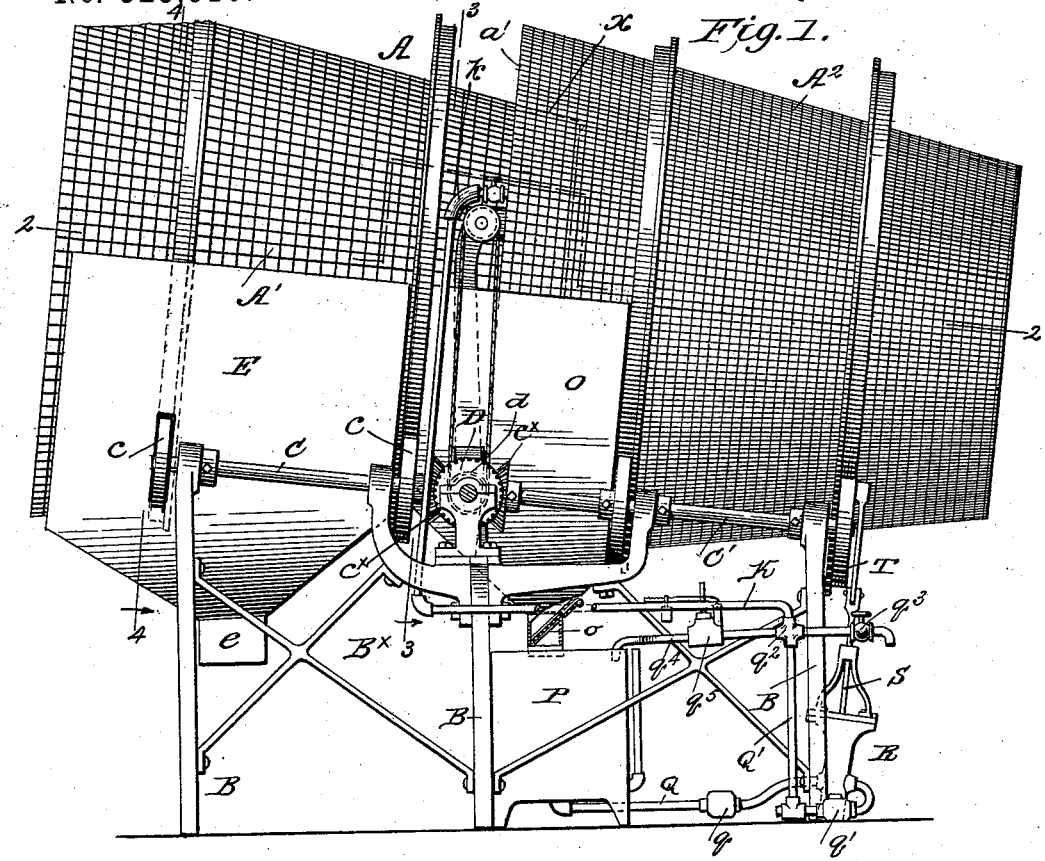
INVENTOR
David R. Fraley.
BY
ATTORNEYS.

(No Model.) 3 Sheets—Sheet 2.
D. R. FRALEY.
TOBACCO CASING MACHINE.
No. 523,910. Patented July 31, 1894.
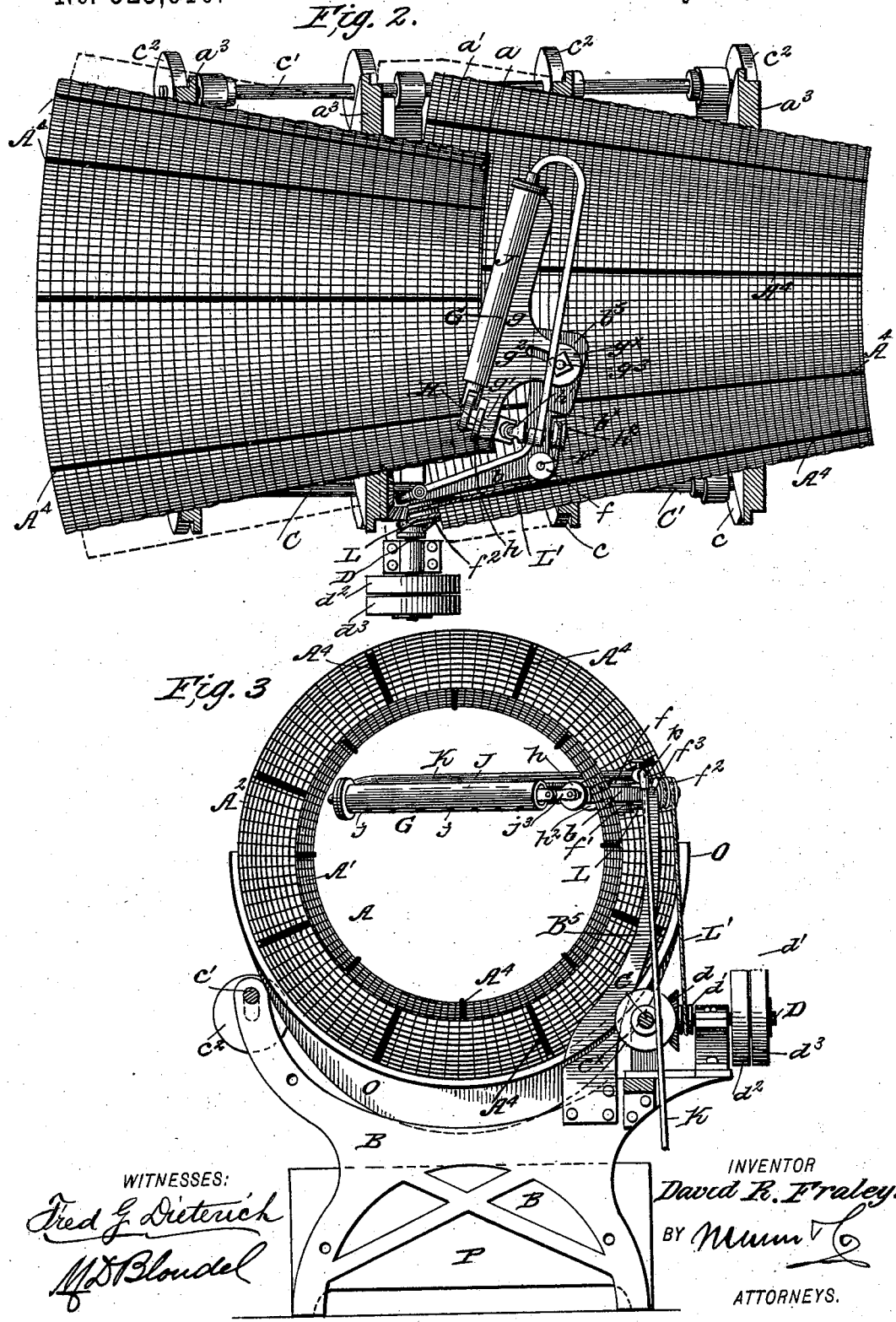
WITNESSES:
INVENTOR
David R. Fraley.
BY 
ATTORNEYS.

(No Model.) 3 Sheets—Sheet 3.

D. R. FRALEY.
TOBACCO CASING MACHINE.

No. 523,910. Patented July 31, 1894.

WITNESSES:
Fred G. Dieterich
M. D. Blondel

INVENTOR
David R. Fraley.
BY Munn & Co.
ATTORNEYS.

UNITED STATES PATENT OFFICE.

DAVID ROBERSON FRALEY, OF WINSTON, NORTH CAROLINA, ASSIGNOR OF ONE-HALF TO GEORGE H. BEALL, OF SAME PLACE.

TOBACCO-CASING MACHINE.

SPECIFICATION forming part of Letters Patent No. 523,910, dated July 31, 1894.

Application filed December 8, 1893. Serial No. 493,074. (No model.)

*To all whom it may concern:*

Be it known that I, DAVID ROBERSON FRALEY, residing at Winston, in the county of Forsyth and State of North Carolina, have invented a new and Improved Tobacco-Casing Machine, of which the following is a specification.

My invention relates to that class of tobacco treating machines in which the tobacco is moistened or flavored preparatory to its being manufactured into plugs, and it has primarily for its object to provide a machine in which the flavoring will be the more thoroughly atomized, and in which the leaves will be the more uniformly and the more effectively agitated or distributed to receive the flavoring liquid.

It has also for its object to provide a casing machine which will operate to thoroughly clean the tobacco of all trash and dirt (which consist principally of small particles of leaf tobacco) and to economize the flavoring or spraying liquid, and yet evenly distribute it on the tobacco.

It has further for its object, to provide means whereby the tobacco as it is agitated and fed forward to receive the spray, will be first wound in one direction, then unwound at the spraying point, and then rewound in a reverse direction, whereby both sides of the leaves will uniformly receive the spraying liquid.

Another object is to provide a sprayer mechanism having an atomizer which can be readily adjusted in relation to the character of the tobacco (long or short leaf) whereby to regulate the direction of the feed of the flavoring liquid onto the tobacco.

With other minor objects in view, all of which will hereinafter be specially referred to, the invention consists in such peculiar arrangement, and novel combination of parts, as will be first described in detail and then be specifically pointed out in the appended claims, reference being had to the accompanying drawings, in which—

Figure 4:
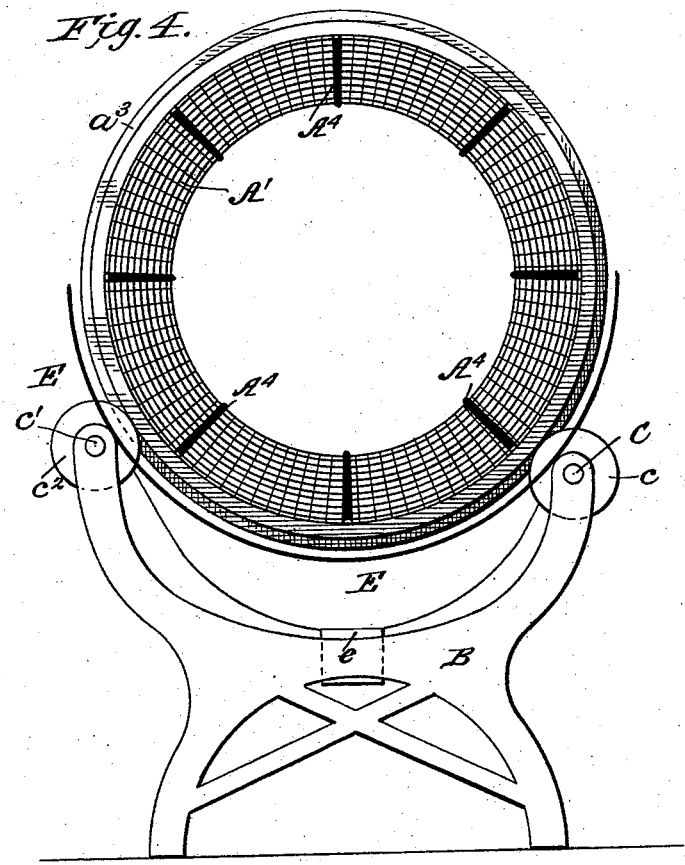
Figure 7:
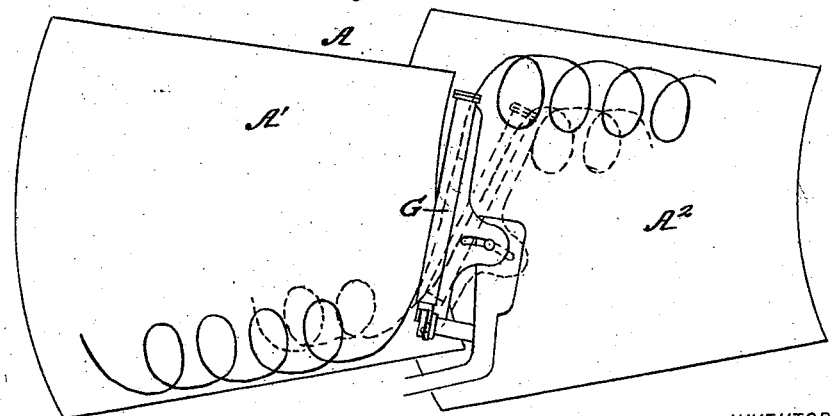

Figure 1 is a side elevation of a tobacco casing machine constructed in accordance with my invention. Fig. 2 is a horizontal section of the same, taken on the line 2—2 Fig. 1. Fig. 3 is a vertical transverse section taken on the line 3—3 Fig. 1 looking in the direction indicated by the arrow. Fig. 4 is a similar view of the same on the line 4—4 Fig. 1. Fig. 5 is a longitudinal section of the atomizer hereinafter referred to. Fig. 6 is a transverse section of the same on the line 6—6 Fig. 5. Fig. 7 is a diagrammatic view hereinafter referred to and Fig. 8 is a view of a modified form of the combined feeding and agitating mechanism.

In the practical construction of my improved machine, I provide, generally, a combined feeding and agitating means, a spraying mechanism having an atomizer held to operate over the agitator at a point where the material is the most thoroughly distributed, a flavoring liquid supply, a pump, and driving mechanism which serves to force the liquid through the sprayer, and drive the agitating and feed means, and means for catching the waste and to force it back into the main supply, whereby it can be continuously reused.

While the construction and general arrangement of parts shown and hereinafter described, form a preferred construction, I desire it understood, that in practice the several detailed arrangements of parts, can be readily modified without departing from the broad ideas of my invention.

Referring to the drawings A indicates what I term a combined feeder and agitator, which in the preferred construction consists of two drums $A'$ $A^2$ which are in the nature of frusto cones, which are mounted to rotate on standards B B, which constitute a main supporting frame $B^\times$ as most clearly shown in Figs. 3 and 4. These drums, which are formed either of open wire work as shown, or sheet metal perforated so as to leave no flat surfaces inside, have their adjacent ends held to lap, i.e. the smaller end of drum $A'$ extends into the larger end of drum $A^2$, as at $a$, whereby a short annular space $a'$ is left between them for a purpose presently explained. These drums have annular flanges or trackways $a^3 a^3$, which are held to travel on drive pulleys $c$ $c$ at one side on drive shafts C C', and at the opposite side on guide pulleys or idlers $c^2 c^2$, mounted on a drive shaft $c'$, such shafts C C' and $c'$ being journaled in the upper ends of the standards B B, as clearly shown in Fig. 3, by reference to which it will be also noticed that the idler pulley shaft is disposed in a higher plane on the sides of the drum, whereby to throw the most of the weight on the drive pulleys $c$ $c$ whereby a better frictional contact is obtained.

Referring now more particularly to Fig. 1 it will be noticed that the drums are held to incline downward from their large or feed end, whereby a longitudinal feed for the tobacco is obtained, but if desired, the drums may be formed of cylinders one held to project into the other as shown in dotted lines $x$ in Fig. 1, or the cylinders may be entirely dispensed with and endless belts $a^x$ formed of open net work, held to travel over circular guide portions $a^6$ as shown in Fig. 8 may be provided, in all constructions however the operation is such, that the cylinders or belts will be caused to rotate reversely to the feed of the tobacco, whereby a rolling action will be imparted thereto as presently more fully explained.

The shafts C C' are projected to a point near the meeting ends of the drums A A', and at such ends they have bevel gears $c^x c^x$, which mesh with a bevel gear $d$, on a main drive shaft D, mounted on a bracket projected at right angles from the frame $B^x$, which shaft has a grooved pulley $d'$ adjacent the gear $d$, and fast and loose pulleys $d^2 d^3$ on its outer end, to which the drive belt $d^4$, driven in any desired manner is connected, as shown. By thus connecting the drive shafts C and C' it will readily appear that as power is applied to shaft D rotary motion will be imparted to drums $A' A^2$ in reverse directions, thus giving, as it were, a combined feed and agitating movement to the drums, the feed movement in both drums being in the same longitudinal direction, while the agitating movement is in reversed directions.

So far as described, it will be seen, that by imparting a rotary reverse movement to the tobacco as it is fed forward, the same will be agitated and wound in one direction by the front drum, and as it passes into the rear drum it will be wound in an opposite direction, and as the ends of the roll or material are thus wound in opposite directions, it follows that at a point centrally or where it leaves one drum and enters the other, it will be unwound or separated. Furthermore, by using rotary cylinders, the tobacco body will feed diagonally forward in reverse directions as indicated in the diagram view Fig. 8, thereby carrying the said body over a greater agitating area and causing it to pass under the spraying devices presently referred to, at an acute angle instead of direct or at right angles, and presenting the unwinding or separated portion of the bulk to the spray, nearly parallel with the atomizer.

The drums which are in practice constructed of copper wire to prevent smearing or gumming, and with elongated meshes to allow the trash to readily fall through, have on their interior, longitudinal ribs $A^4$ which assist in raising the tobacco up the sides of the drums to more effectually turn it over and over. Beneath the front drum is held a jacket or casing E, which terminates in a central discharge $e$, which casing collects the trash and dirt and deposits it at one place under the front drum.

As before stated, the atomizer is arranged to discharge into the drums or other agitating and feeding mechanism at a point where the tobacco unwinds and for this purpose the same is adjustably held projected in the drum as will presently appear.

By referring now to Figs. 2 and 3 in which the general arrangement of such atomizer is most clearly illustrated, it will be seen, that the same is connected with an upwardly curved arm $B^5$, projected up from the main frame $B^x$, which arm has a horizontally disposed rearwardly extending arm $b$ which passes through the annular space between the drums, and has at its outer end a short vertical shaft F projected at each side, and provided with grooved pulleys $f$ $f'$; it also has a horizontally disposed double pulley $f^2$ at its elbow $f^3$ as shown. The outer end of the arm $b^x$ terminates in a horizontal bracket $b^5$, which forms a bearing plate for the atomizer G, which comprises a horizontal member $g$, the inner end of which has a bearing arm $g'$, in which is journaled a short shaft H, having at one end a crank disk $h$ for a purpose presently explained, while its other end is connected by a universal coupling $h'$, with a short shaft journaled in the inner end of the bracket $b^5$, and which has at its outer end a grooved pulley $h^2$ as most clearly shown in Fig. 2.

The member $g$ of the atomizer has an ear $g^x$, which has an elongated slot $g^2$ curved on an arc with the universal coupling as a center, through which slot passes a securing bolt $g^3$, which connects such member with the bracket $b^5$. Upon the front end of the member $g^5$ is fixedly held a cylinder J in the lower face of which is formed a series of countersunk apertures $j$, tapering from their inner faces outward as shown most clearly in Fig. 5, and in such cylinder is held to operate a hollow piston J', in the under face of which is formed a series of transverse elongated slots $j'$ which taper from their lower edges inward; and to the rod $j^2$ of such piston is connected a pivotal crank arm $j^3$ which connects with the crank $h'$ before referred to and as clearly shown in Fig. 2.

K indicates a supply pipe which extends through the annular space between the drums, has a jointed section $k$ where it enters the drums transversely and projects over the atomizer and opens into its outer end as at $k'$, the outer extension of the said pipe K being connected with a main supply tank as will presently be more fully set out.

By providing a liquid discharging device constructed as described, it will be seen that the piston will also act as a cutter, as its countersunk apertures pass over the outer apertures. Thus, in operation, should any obstruction enter the countersunk apertures in the outer cylinder, such obstruction is cut off even with the inner edge of such apertures, and that part of the said obstacle which is cut off passes out readily through the apertures with the spray, such operation continuing until the whole obstruction is cut off and passed out, and serving as it were to keep the atomizer jet openings from becoming clogged. The piston (which is operated by the belts L L' which pass from the drive shaft D over the several intermediate pulleys and connect with the shaft H in the manner clearly shown in Figs. 2 and 3) passing quickly back and forth in the cylinder J, prevents a steady stream of the spraying fluid passing out the openings in the outer tube, as such stream is shut off at each stroke of the piston, or inner tube, thus atomizing the spraying fluid, and discharging it in intermittent spurts.

It will be noticed by reference to Fig. 8 that the unwound or distributed part of the tobacco bulk is disposed practically transversely to the direction of feed, which position of such part varies in length and angularity in accordance with the character of the tobacco being treated. Thus, in casing short tobacco the unwinding portion will extend almost squarely across, whereas in casing long tobacco, it will be somewhat diagonally disposed as indicated in dotted lines in Fig. 8. To this end the atomizer is pivotally and adjustably held in the manner before stated, whereby it can be swung obliquely, when casing long tobacco and move transversely, when casing short tobacco.

O indicates a jacket or trough held under the drums and which extends from the second annular rim of the first drum to the first annular rim on the second drum as clearly shown in Fig. 1, which is provided to catch the flavoring or spraying fluid, which is forced by the action of the atomizer through the meshes of the drums, which occurs when there is no tobacco directly under the atomizer to receive the flavoring; and such jacket has a tube which discharges into a main fluid holding tank P held on the main frame and which tube is provided with a strainer $o$ whereby the liquid is strained before it passes back into such tank.

A supply Q is connected with the bottom of tank P which connects with a pump R, at one side, it having a back pressure check valve as at $q$. From the opposite side of the pump extends a feed pipe Q' which is also provided with a check valve $q'$ and which extends up and connects with a union coupling $q^2$ with which the spray or atomizer supply pipe K before referred to connects, and with which also connects a valved drain cock $q^3$, and a drain pipe $q^4$ which discharges into the tank P which pipe $q^4$ is provided with a pressure valve $q^5$. The pump piston rod connects with and is operated by a pitman S, connected with a crank disk T on the end of drive shaft C'.

In operation the cock $q^3$ is kept closed and as the shaft C' is operated from the main drive shaft it follows that the pump will be continuously kept in operation, to draw the liquid from the tank and force it up to the atomizer. It will be also manifest that, should the pump supply a greater amount than the atomizer can properly discharge, the pressure in the supply pipe will be sufficient to overcome the pressure of valve $q^5$, which will allow the excess or overflow of the liquid to pass back into the tank, thus maintaining as it were, at all times, a given pressure in the atomizer, and the greater the pressure, the more flavoring or spraying fluid will be discharged onto the tobacco. When the machine is stopped for any length of time, as for instance at the end of the day's work, the liquid held in the spray supply pipe is drawn off through cock $q^3$.

By constructing the agitator and feed devices of a body formed of an open net work, no flat surface is presented to catch and hold the flavoring, and such construction is absolutely necessary to properly case tobacco, as the tobacco must have the flavoring distributed uniformly, which can not be accomplished by the use of a solid drum or agitator, in that, the tobacco leaves falling on a solidly coated surface are besmeared with the flavoring, which is ruinous to the tobacco, because, first, the besmeared leaves have too much flavoring on them, and second, the lump picker can never tell when a lump containing a few of such besmeared leaves, is dry enough to go into the shapes, and if a few such lumps find their way into a box, they will surely cause the box of tobacco to rot. Furthermore, by providing drums formed of wire mesh or a perforated body the trash and dirt will not be carried up by the ribs and be dropped by gravity down on top of the tobacco in the drum as the trash will be sifted through the drums as the leaves are carried up and dropped. It will be also obvious that instead of using two drums or devices for turning the tobacco in opposite directions and one sprayer, the number may be increased to give the tobacco a greater number of winding and unwinding movements.

The great advantage in turning the tobacco as before stated, is, that by reversing it, and reforming the roll, the spray can be more uniformly distributed, as both sides of the leaves are positively presented to the action of the spray. It will be also readily apparent that by providing an atomizer, which has as it were, self cleaning devices for the discharge apertures, that such apertures will not be clogged by the fiber usually contained in the flavoring liquid, as such fiber will be cut as it passes into the jet or discharge openings.

From the foregoing description taken in connection with the drawings it is thought that the complete operation of the machine and its many advantages will be readily apparent.

Having thus described my invention, what I claim, and desire to secure by Letters Patent, is—

1. A tobacco casing machine comprising a tobacco receiver, formed of a plurality of sections, and means for operating such sections to continuously feed the tobacco forward and at the same time agitate or roll it successively in reverse directions, substantially as and for the purposes specified.

2. A tobacco casing machine, having a receiving chamber, formed of sections, means for moving such sections, in reverse directions, transversely, said sections being inclined to feed the material longitudinally as it is agitated, substantially as and for the purposes shown and described.

3. A tobacco casing machine, comprising a tobacco receiver formed in sections, means for operating such sections in reverse directions to agitate and roll the tobacco leaves reversely, said sections being arranged to operate to feed the tobacco longitudinally forward, as they are reversely operated, and a sprayer projected transversely over the said sections, and arranged to discharge on the material as it passes from one section to the other all substantially as shown and for the purposes described.

4. An improved tobacco casing machine comprising two or more drums adapted to receive the tobacco at one end and feed it longitudinally forward, said drums held to rotate in reverse directions, means for operating the drums whereby to roll the tobacco in reverse directions, and a sprayer held to discharge into the drums all substantially as shown and for the purposes specified.

5. In a machine for treating tobacco, in combination, a combined feeder and agitator, comprising a pair of drums, held to feed the tobacco longitudinally forward, their meeting ends being held adjacent to form practically a continuous drum, said drums held to rotate in reverse directions and means for operating such drums in reverse directions, whereby the tobacco after it is rolled up in the forward drum is unwound and rewound as it feeds into the rear drum, in a reverse direction, all substantially as shown and for the purposes described.

6. In a machine for casing tobacco, a combined feeder and agitator comprising two drums having their meeting ends lapped and constructed to continuously feed the material forward, and reversely rotatable means for operating the drums, and a sprayer held in the drums over their lapped ends, and adapted to discharge the fluid on the material as it passes from one drum to the other, all substantially as shown and described.

7. A machine for treating tobacco, comprising a pair of feed drums formed of a reticulated or foraminated body, held to rotate in reverse directions, and adapted to feed longitudinally in the same direction, and a sprayer arm projected into the said drums and held to discharge at the meeting ends of the drums, and means for operating the drums, all substantially as shown and described.

8. A tobacco casing machine, comprising a pair of frusto conical drums having their adjacent ends held to lap, whereby an annular space is formed and adapted to feed the material forward, a sprayer projected through such space into the interior of the drums, said drums rotatable in reverse directions, whereby the leaves will be wound reversely and fed forwardly in reverse diagonal directions and means for operating the drums, substantially as and for the purposes described.

9. As an improvement in tobacco casing machines, in combination, a sprayer, a feeding mechanism adapted to carry the tobacco under the sprayer, said mechanism including means for agitating and rolling the tobacco in reverse directions and unwinding it as it passes under the sprayer all substantially as and for the purposes shown and described.

10. In a tobacco casing machine, essentially as described, the combination with the feeding and agitating mechanism, adapted to feed the tobacco longitudinally forward, of a sprayer mechanism, having an atomizer arm projected over the material and laterally adjustable relatively to the direction of the feed of such material, substantially as shown and for the purpose described.

11. In a tobacco casing machine, the combination with a feeding mechanism adapted to agitate and carry the material under the sprayer as it is agitated, of a sprayer having its discharge end projected over the path of the moving tobacco, said end having spray openings, and cutter devices operating over such spray openings, and means for feeding the sprayer and operating the cutter devices, all substantially as shown and described.

12. A tobacco casing machine, having a rotary receiving chamber adapted to feed the material longitudinally forward as it is agitated and means for rotating it, a sprayer mechanism, comprising a supply pipe, an atomizer arm connected therewith, formed of a fixed cylinder having discharge openings, and a hollow piston operating within the cylinder, and having openings adapted to be alternately moved into register with the outer cylinder openings, whereby an intermittent discharge or spray is obtained and means for operating the piston and supplying the sprayer, all substantially as shown and described.

13. In a tobacco casing machine, a feeder and agitator, consisting of a plurality of drums each formed of a screen like body having longitudinal ribs on its inner face, said drums having their adjacent ends held to lap, means for rotating such drums in reverse directions, and a spraying device projected into the drums, and adapted to discharge the liquid onto the material transversely to its feed direction as set forth.

14. In a tobacco casing machine, the combination with the feed and agitating mechanism arranged substantially as shown, of the sprayer held to discharge onto the material as it is fed and agitated, comprising a fixed cylinder having spray apertures tapering outward, a hollow piston operating therein having transverse slots tapering inward, a feed pipe connected with the cylinder, and means for operating the hollow piston all arranged substantially as shown and described.

DAVID ROBERSON FRALEY.

Witnesses:
D. L. DE VANE,
WM. R. FLOOD.